US 6,658,518 B2

(12) United States Patent
Domon

(10) Patent No.: US 6,658,518 B2
(45) Date of Patent: Dec. 2, 2003

(54) SERIAL BUS CONNECTION CONTROLLER FOR ESTABLISHING A LOGICAL CONNECTION BETWEEN INITIATOR AND TARGET NODES IN A FIRST-TO-WIN RACING CONDITION

(75) Inventor: Wataru Domon, Tokyo (JP)

(73) Assignee: NEC Corporation, Tokyo (JP)

( * ) Notice: Subject to any disclaimer, the term of this patent is extended or adjusted under 35 U.S.C. 154(b) by 496 days.

(21) Appl. No.: 09/745,961

(22) Filed: Dec. 22, 2000

(65) Prior Publication Data

US 2001/0005874 A1 Jun. 28, 2001

(30) Foreign Application Priority Data

Dec. 24, 1999 (JP) .............................. 11-368423

(51) Int. Cl.⁷ ..................... G06F 15/163; G06F 1/26; H04Q 3/52; H04L 12/40
(52) U.S. Cl. .................. 710/305; 710/105; 713/300
(58) Field of Search .................. 710/305, 163.1, 710/316, 104, 300, 100, 6, 1.05, 107; 326/37; 712/32, 29; 713/300; 709/232, 235, 223, 225, 226, 253; 716/12; 370/230, 230.1, 236, 423, 395.2, 463, 400, 396; 340/825.5

(56) References Cited

U.S. PATENT DOCUMENTS 4,953,162 A * 8/1990 Lyons et al.
5,793,976 A * 8/1998 Chen et al.
6,181,679 B1 * 1/2001 Ashton et al.
6,570,850 B1 * 5/2003 Gutierrez et al.

FOREIGN PATENT DOCUMENTS

| JP | 5-204785 | 8/1993 |
| JP | 7-273781 | 10/1995 |
| JP | 8-171435 | 7/1996 |

OTHER PUBLICATIONS

JP Office Action dated Aug. 13, 2000 with English translation of relevant parts.

* cited by examiner

*Primary Examiner*—Gopal G. Ray
(74) *Attorney, Agent, or Firm*—Dickstein, Shapiro, Morin & Oshinsky, LLP.

(57) ABSTRACT

A connection controller for a serial bus network includes physical layer processing circuitry for performing the protocol of the physical layer of the network to establish communications with first, second and third nodes. The first node is specified as an initiator node and the second node is a target node of the first node. The physical layer processing circuitry is energized by power supplied from the first node. To reliably establish connections between desired nodes in a first-to-win racing environment, a delay time is introduced in response to the physical layer processing circuitry being energized. During the delay time, a logical connection is established between the first and second nodes and the third node is set in a disabled state.

24 Claims, 15 Drawing Sheets

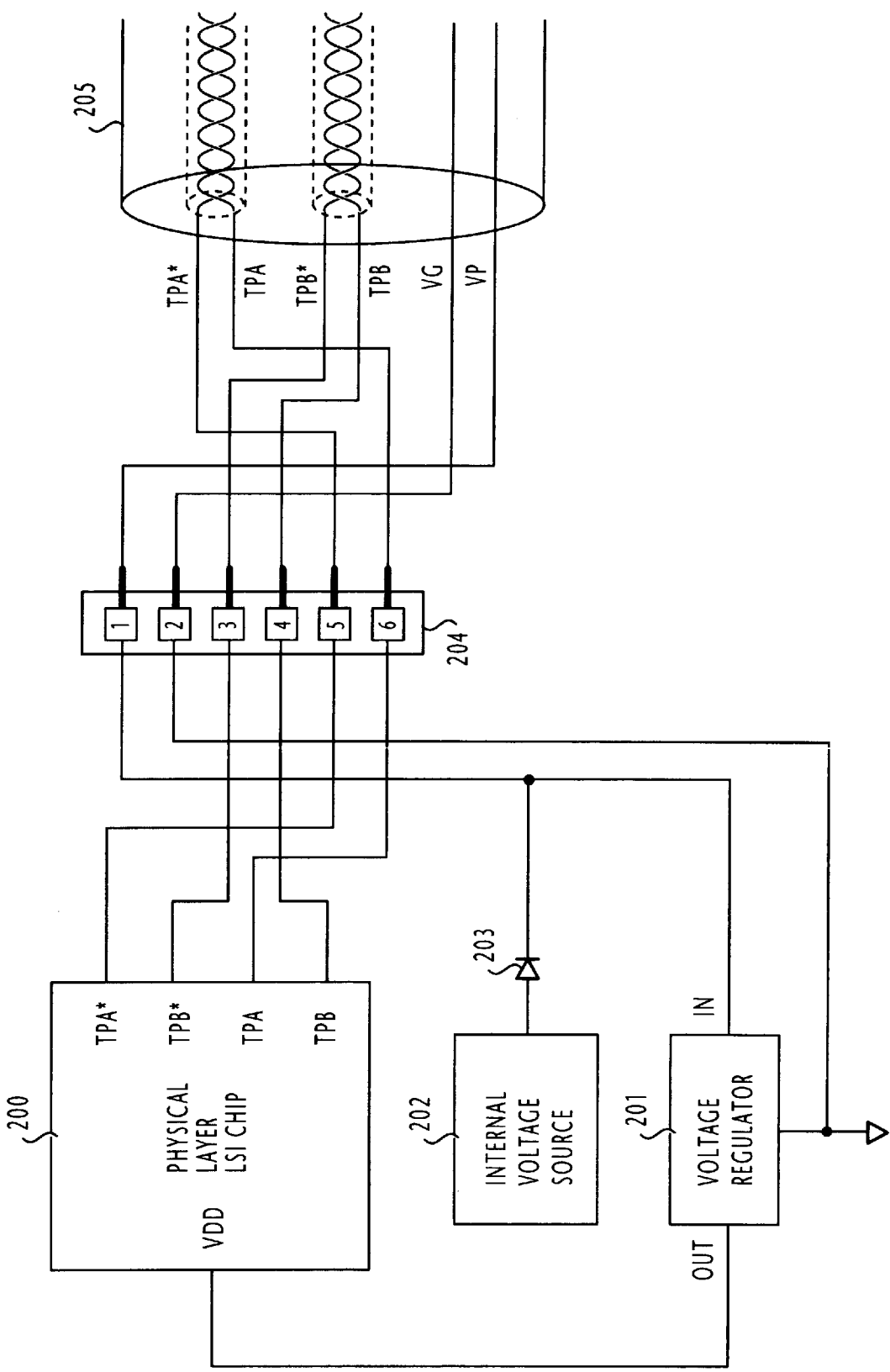

COMPUTER 20 (FIG. 21)

SERIAL BUS CONNECTION CONTROLLER FOR ESTABLISHING A LOGICAL CONNECTION BETWEEN INITIATOR AND TARGET NODES IN A FIRST-TO-WIN RACING CONDITION

BACKGROUND OF THE INVENTION

1. Field of the Invention

The present invention relates generally to a technique for reliably establishing a logical connection between desired nodes of a serial bus network such as IEEE-1394 or universal serial bus (USB) network.

2. Description of the Related Art

Serial Bus Protocol 2, known as SBP-2, is standardized by ANSI (American National Standards Institute) as ANSI-NCITS 325-1998 for allowing transfer of SCSI (Small Computer System Interface) data between nodes attached to an IEEE-1394 serial bus. The SBP-2 standard specifies an access protocol for establishing a logical connection between a node (called initiator) that asserts a collection request on the bus and a node (called target) that receives the request from the bus. Specifically, the access protocol specifies a login process for establishing a logical connection, a reconnection process for re-establishing the logical connection on the IEEE-1394 serial bus after the bus is reconfigured in response to a bus reset request, and a logout process for clearing the logical connection. A login process begins when an initiator makes a search through the network for a target node by examining the information stored in the configuration ROMs of all attached nodes. If such a target node is present, the initiator reads the address of the management agent register from the configuration ROM of the target node and writes the address of a login request in that register. In response, the target node sends a read request to the initiator, which replies with a login read response. The target node then requests the initiator to return its global unique identifier (i.e., node_vendor_id, chip_id_hi/chip_id_lo) by reading it from its configuration ROM. In response to the global unique identifier, the target node writes a login response into the login response register of the initiator and then reads the result of the login process (i.e., login status) from a status block and writes it into the status FIFO of the initiator. If the login process is successful, a logical connection has been established between the initiator and the target node.

Since a logical connection is established by a node when it wins the race in a login process, the SBP-2 access protocol is said to be based on a first-to-win principle. Assume that an IEEE-1394 serial bus network is comprised of two computers compliant with the SBP-2 standard and a hard disk drive which is specified as the target of one of the computers. If one of the computer succeeds in a login process, it obtains the right to use the hard disk drive as its peripheral device. However, the first-to-win scheme does not guarantee that the winner is always the desired computer of a peripheral device. Therefore, no SBP-2 compliant devices are currently available that can identify an initiator node for reliably establishing a logical connection to a target device.

SUMMARY OF THE INVENTION

It is therefore an object of the present invention to provide a connection controller and a method for a serial bus network for ensuring that an initiator node reliably establishes a logical connection to a target node.

According to a first aspect of the present invention, there is provided a connection controller for a serial bus network in which a plurality of layered protocols are provided to establish communication, the layered protocols including the protocol of a physical layer. The connection controller comprises physical layer processing circuitry for performing the protocol of the physical layer, and establishing communications with first, second and third nodes of the network, the first node being specified as an initiator node and the second node is a target node of the first node. Delay means is provided for introducing a delay time when the physical layer processing circuitry is energized. The physical layer processing circuitry is energized by power supplied from the first node for establishing a logical connection between the first and second nodes during the delay time and setting the third node in a disabled state during the delay time.

According to a second aspect, the present invention provides a connection controller for a serial bus network in which a plurality of layered protocols are provided to establish communication, the layered protocols including the protocols of a physical layer and a link layer The connection controller comprises first, second and third cable ports, the first cable port being connected to a first node. Physical layer processing circuitry, connected to the first, second and third cable ports and energized by power supplied from the first node through the first cable port, performs the protocol of the physical layer. Link layer processing circuitry performs the protocol of the link layer and is energized by power supplied from the first node through the first cable port. Control circuitry is connected to the physical layer processing circuitry via the link layer processing circuitry for determining whether second and third nodes are respectively present at the second and third cable ports, setting the third cable port in a disabled state immediately after the physical layer processing circuitry is energized while establishing a logical connection between the first and second nodes if the second and third nodes are determined to be present at the second and third cable ports, and setting the third cable port in an enabled state after the logical connection is established.

According to a third aspect, the present invention provides a serial bus network in which a plurality of layered protocols are provided to establish communication, the layered protocols including the protocol of a physical layer. The network comprises first, second and third nodes, and first, second and third cable ports, the first cable port being connected to a first node. Physical layer processing circuitry, connected to the first, second and third cable ports and energized by power supplied from the first node through the first cable port, performs the protocol of the physical layer. The first node determines a network topology of nodes connected to the second and third cable ports, determines from the network topology whether the second and third nodes are present at the second and third cable ports, respectively, disables the third cable port immediately after the physical layer processing circuitry is energized while establishing a logical connection with the second node, and enables the third cable port after the logical connection is established.

According to a fourth aspect, the present invention provides a method of controlling a serial bus network in which a plurality of layered protocols are defined to establish communication, the layered protocols including the protocol of a physical layer, wherein the network includes first, second and third nodes and physical layer processing circuitry associated with the first, second and third nodes for performing the protocol of the physical layer, wherein the first node is specified as an initiator node and the second node is a target node of the first node. According to the method, the physical layer processing circuitry is energized with power from the first node when the first node is powered on. In response to the application of power from the first node, the physical layer processing circuit establishes a logical connection between the first and second nodes while the physical layer processing circuitry is prevented from establishing a logical connection between the second and third nodes.

According to a further aspect, the present invention provides a processing circuit for a physical layer of layered protocols of a serial bus network, comprising a plurality of signaling ports, a port status control terminal, and an LSI chip connected to the signaling ports and the port status control terminal for performing the protocol of a physical layer, the LSI chip being responsive to a control signal received through the port status control terminal for holding a predetermined one of the signaling ports in a disabled state and holding the predetermined signaling port in an enabled state when the control signal changes state.

According to a still further aspect, the present invention provides a physical layer LSI chip for a physical layer of layered protocols of a serial bus network, comprising a plurality of signaling ports, timer means for measuring elapse of time from the instant the physical layer LSI chip is energized and producing a first signal when the measured time is smaller than a predetermined value and a second signal when the measured time is greater than the predetermined value, and port status control means for disabling a predetermined one of the signaling ports during the presence of the first signal of the timer means and enabling the predetermined signaling port during the presence of the second signal.

BRIEF DESCRIPTION OF THE DRAWINGS

The present invention will be described in detail further with reference to the following drawings, in which:

FIG. 2 is a block diagram illustrating the wiring of a typical node of the network to an IEEE-1394 cable;

FIGS. 4A and 4B show network configurations observed by bus analyzers of FIG. 3 one minute after an initiator computer is powered on;

FIG. 5 shows a network configuration equally observed by both analyzers five minutes after the initiator computer is powered on;

FIGS. 11A and 11B show network configurations observed by bus analyzers of FIG. 9 one minute after an initiator computer is powered on;

FIG. 12 shows a network configuration equally observed by both analyzers five minutes after the initiator computer is powered on;

DETAILED DESCRIPTION

Figure 1:
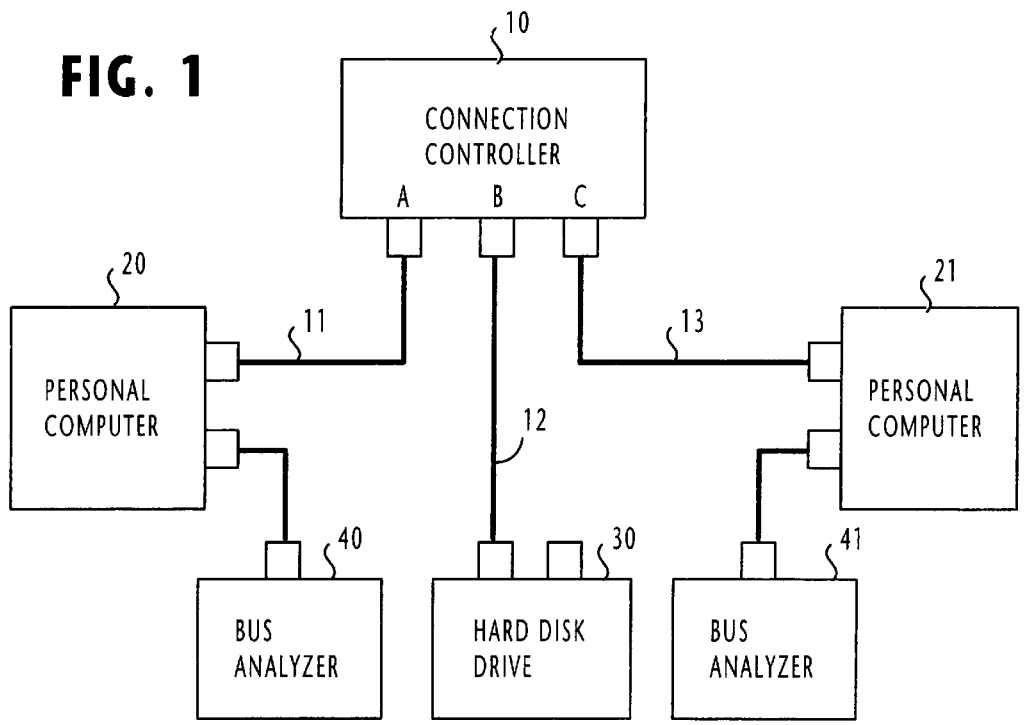
FIG. 1 is a schematic block diagram of a serial bus network according to one embodiment of the present invention in which the initiator computer is connected to a serial bus of the cable environment of the network.

Referring now to FIG. 1, there is shown a serial bus system of the type such as IEEE 1394 standard configured according to one embodiment of the present invention. The inventive serial bus system is comprised of a connection controller 10 having 6-pin connector terminals (or ports of the cable environment of the IEEE-1394 serial bus network, or simply cable ports) A, B and C, as specified by the IEEE 1394 standard as "1394-connectors", to which the 1394 serial buses or cables 11, 12 and 13 of the cable environment of the IEEE-1394 network are attached for connection to other nodes (devices) of the network. Personal computers 20 and 21 are connected to the connection controller 10 at cable ports A and C, respectively, via cables 11 and 13 and a hard disk drive 30 is attached to port B via cable 12. Bus analyzers 40 and 41 are connected to the personal computers 20 and 21, respectively, for observing device configuration and packets on the serial bus and displaying the observed events on a screen. Each of the personal computers 20 and 21 is provided with 6-pin connector terminals. Two of the 6 pins are used as cable power connections (VP, VG) to the serial bus.

Typical wiring of a 6-pin connector terminal of an IEEE-1394 node is shown in FIG. 2. The node includes a physical layer LSI (PHY) chip 200, a voltage regulator 201, and an internal voltage source 202 with a diode 203. These circuits are connected to the 6-pin connector terminal 204. According to the specification of the IEEE 1394 standard, the 6-pin connector terminal 205 has pins #1 and #2 for cable power connection from the internal power supply unit 202 and ground terminal to a 6-conductor cable 205. Connector pins #3 to #6 are connected to the physical layer processor 200 and cable 205 via two pairs of TPA and TPB (twisted pairs A and B) terminals for carrying strobe and data signals for the purposes of differential signaling and data transfer. Each peripheral device is capable of operating as a cable power source or a cable power sink. Power supply unit 202 and diode 203 permit the node to operate in either of these modes.

When the peripheral device is used as a power source, the output of power supply unit 202 is passed through the diode 203 and the connector pin #1 to the cable 205. The cable power voltage must be maintained within the range between 8 and 40 volts as specified by the IEEE 1394 standard. The voltage regulator 201 converts the voltage from diode 203 to a level suitable to power the PHY chip 200. When the internal voltage source 202 is not turned on, the peripheral device operates as a power sink, in which the power voltage from the cable 205 appears at connector pin #1 and is supplied to the voltage regulator 201. Diode 203 isolates the internal voltage source 202 from this cable power. According to the long distance version of the IEEE P1394a standard currently under study, a 4-pin connector is proposed to eliminate the two cable power pins.

Returning to FIG. 1, the hard disk drive 30 is one of the peripheral devices that are in compliance with the SBP-2 standard. Assume that the user intends to use the disk drive 30 as a peripheral device of the personal computer 20.

According to the present invention, the connection controller 10 is provided to ensure that the hard disk drive 30 operates as a peripheral device (target node) of a desired (initiator) computer. For this purpose, the cable port B of connection controller 10 is connected to a peripheral device 30, the cable port A is connected to the initiator computer 20, and the cable port C to the computer 21 that is not intended to use the peripheral device 30 as a target node.

Figure 3:
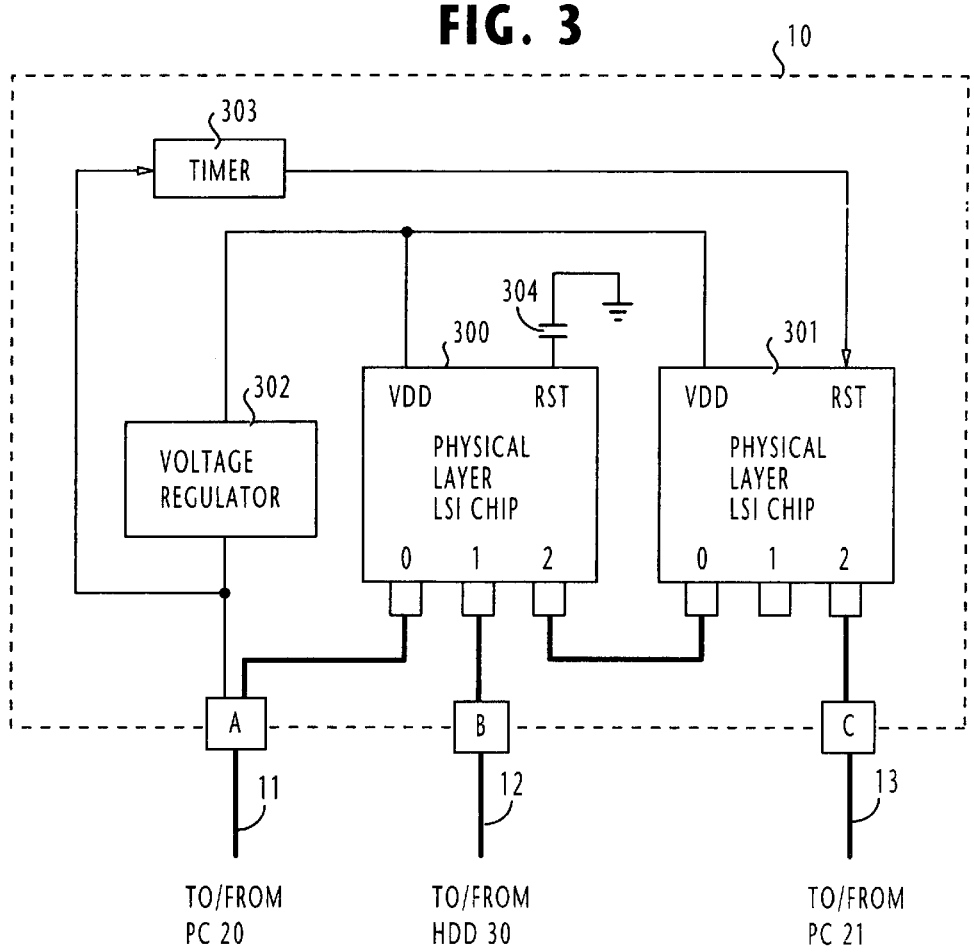
FIG. 3 is a block diagram of a connection controller of the network of FIG. 1.

As shown in FIG. 3, the connection controller 10 includes three-port PHY chips 300 and 301, a voltage regulator 302 and a timer 303. Physical layer chips 300 and 301 are powered by a regulated voltage supplied from the voltage regulator 302, Voltage converter 302 is coupled to the pin #1 of the cable port A for converting cable voltage to a constant operating level of the PHY chips. Timer 303 is also connected to the pin #1 of the port A. Alternatively, the timer 303 may be connected to the output of voltage regulator 302.

PHY chips 300 and 301 operate when the port A is powered via cable 11 from the initiator computer 20. PHY chip 60 has its signaling port #0 connected to the signalling ports #3 to #6 of port A, its signaling port #1 connected to the port B, and its signaling port #2 connected to the signaling port #0 of PHY chip 301 whose signaling port #2 is connected to the cable port C. All of these signaling connections are established by a four-line bus. Terminators and noise reduction filters may be coupled between the PHY chips 300, 301 and the cable ports A, B and C.

Each of the physical layer chips is provided with a reset terminal RST for chip initialization. When the input voltage at each reset terminal is low, the associated PHY chip is initialized. When the reset input voltage goes high, the associated chip begins a normal operation. The reset terminal of each PHY chip is pulled up by a resistor provided within the associated PHY chip. Thus the provision of a capacitor 304 between the reset terminal of PHY chip 300 and ground allows a sufficient time for the PHY chip 300 to perform initialization by charging the capacitor 304 and temporarily holding the reset terminal at low level. Thus, the PHY chip 300 performs initialization for an interval of 100 milliseconds, for example, immediately after its power is supplied from the voltage regulator 302.

On the other hand, the reset terminal of PHY chip 301 is connected to the output of the timer 303 to which the pin #1 of port A is connected. Timer 303 starts counting clock pulses when the input voltage from computer 20 exceeds some threshold level. Until the timer 303 attains a predetermined count value, it holds the reset terminal of PHY chip 61 at a low voltage. By setting the threshold level at 7 volts, the timer 303 will remain low and hence the PHY chip 301 will remain in a reset state for a period of two minutes after the computer 20 starts feeding power to the cable port A of the connection controller 10. Therefore, it is only the PHY chip 300 that operates during the initial two-minute reset interval. When this reset interval elapses, normal operation begins in PHY chip 301.

Figure 4A:
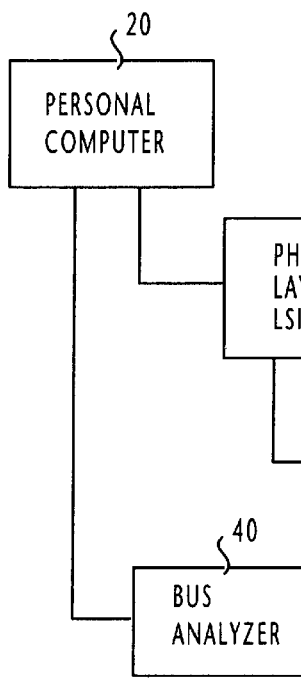
Figure 4B:
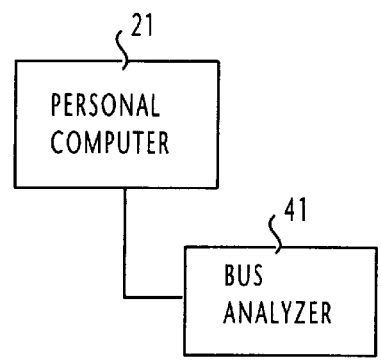
Figure 5:
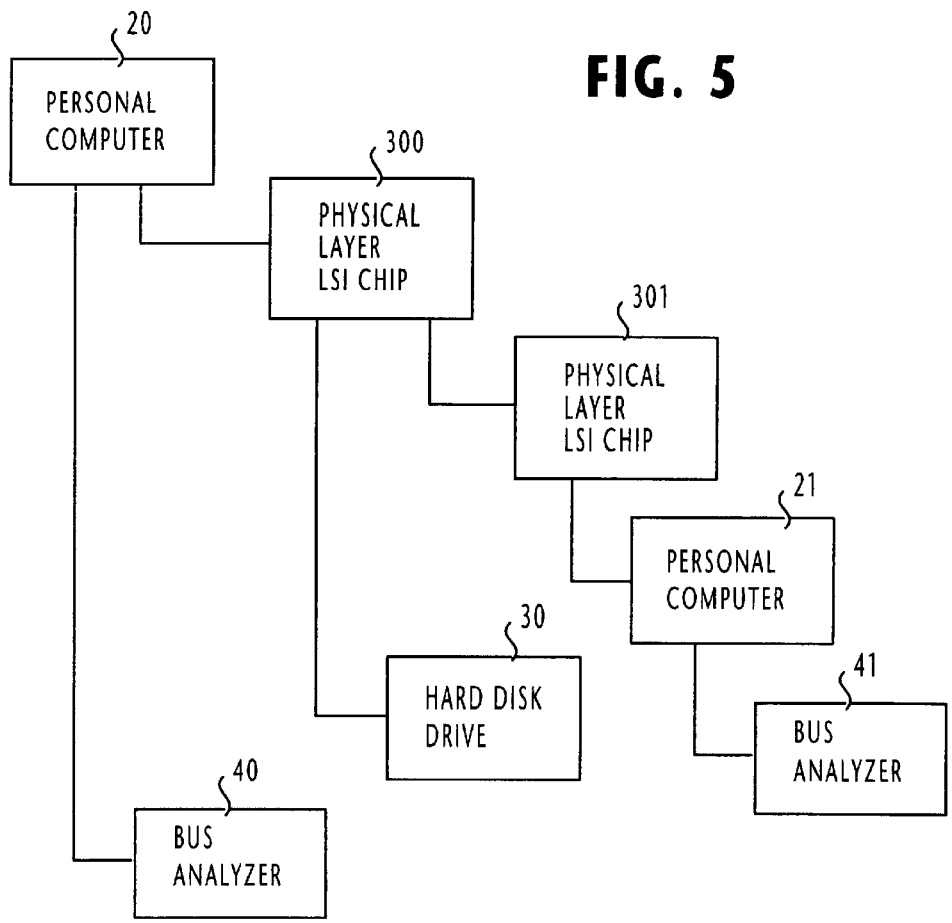

FIGS. 4A and 4B show network configurations observed by the bus analyzers 40 and 41 of FIG. 3, respectively, one minute after the initiator computer 20 is powered on. Since the PHY chip 301 is held in a reset state during the initial two-minute interval, it is not observed by the bus analyzer 41 and thus not displayed as shown in FIG. 4B, whereas the PHY chip 300 is already in a normal operation, it can be observed by the analyzer 40 and displayed with the hard disk drive 30 as shown in FIG. 4A. FIG. 5 shows a network configuration equally observed and displayed by both bus analyzers 40 and 41 five minutes after the computer 20 is powered on.

Figure 6:
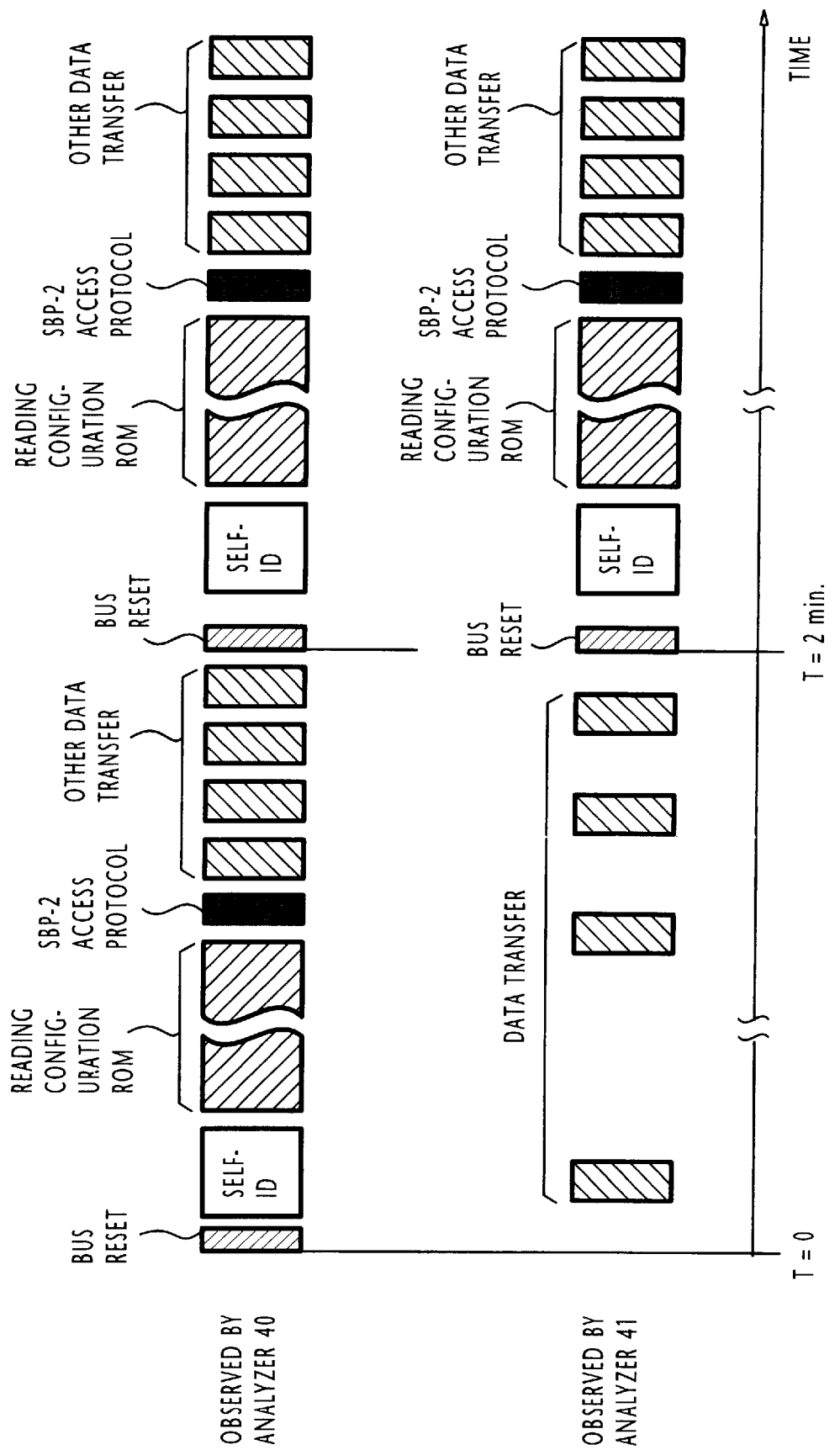
FIG. 6 is a timing diagram illustrating the flows or packets and events observed by the bus analyzers on respective serial buses.

A further test was conducted by the bus analyzers 40 and 40. In this test, the analyzers observed flows of packets and events that occurred on respective serial buses of the computers 20 and 21. These observations are shown in FIG. 6. At time t=0, the computer 20 was switched on, which triggered a bus reset. The bus reset was followed by a self-ID process in which the analyzer 40 observed packets between the PHY chips of the attached devices to assign physical identifiers. After the self-ID process, the analyzer 40 observed that the computer 20 proceeded to read the configuration ROM of each device, exchanged packets according to the SBP-2 access protocol, and performed transfer of other packets. Computer 20 thus successfully performed a login process. At time−2 minutes a bus reset occurred again. Computer 20 issued a reconnection request to the hard disk drive 30. This reconnection procedure was successfully completed and transfer of packets was observed between the computer 20 and the hard disk drive 30.

On the other hand, the analyzer 41 observed peer-to-peer packet transfers during the two-minute reset interval. After the two-minute interval the analyzer 41 observed the computer 21 detecting the hard disk drive 30 and performing a login process, which resulted in a failure. Thus, a connection is reliably established between a target computer and a peripheral device by temporarily holding an untargeted computer in a reset state.

Figure 7:
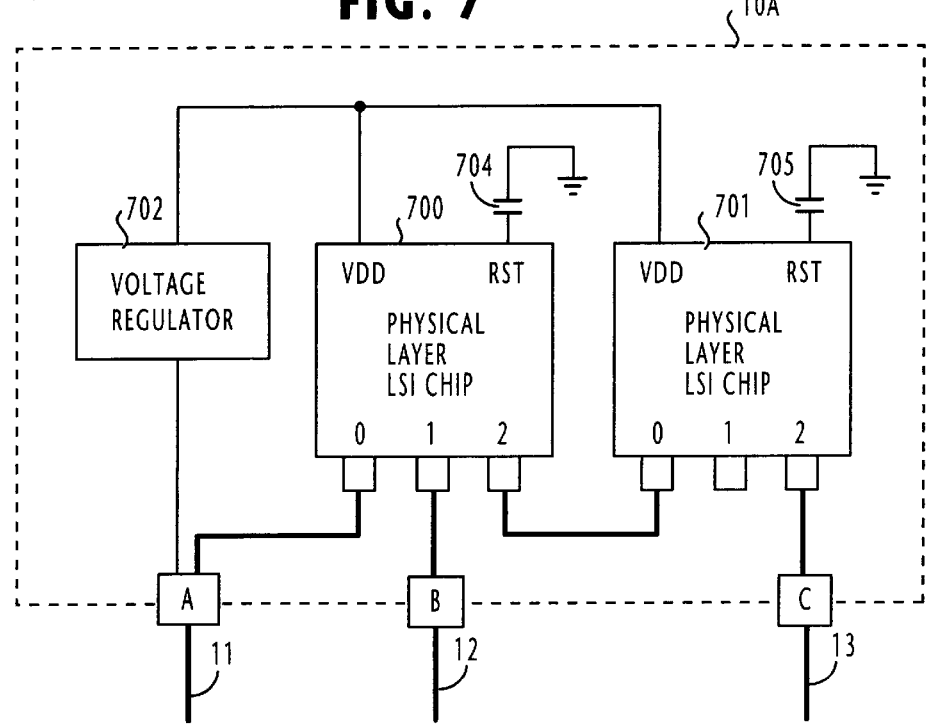
FIG. 7 is a block diagram of a connection controller according to a modified embodiment of the serial bus network of FIG. 1.

Connection controller 10 of FIG. 3 can be modified in a number of ways. One modification of the connection controller as marked 10A is shown in FIG. 7. Instead of the timer 303 of FIG. 3, a capacitor 705 is provided, which is connected to the reset terminal of PHY chip 701. Capacitor 705 has a much larger capacitance value than the capacitor 704 of PHY chip 700 for holding the computer 21 in the reset state for a period sufficient to allow the computer 20 to succeed in a login process. Both PHY chips 700, 701 are energized by voltage regulator 702 that converts cable voltage from the port A.

Figure 8:
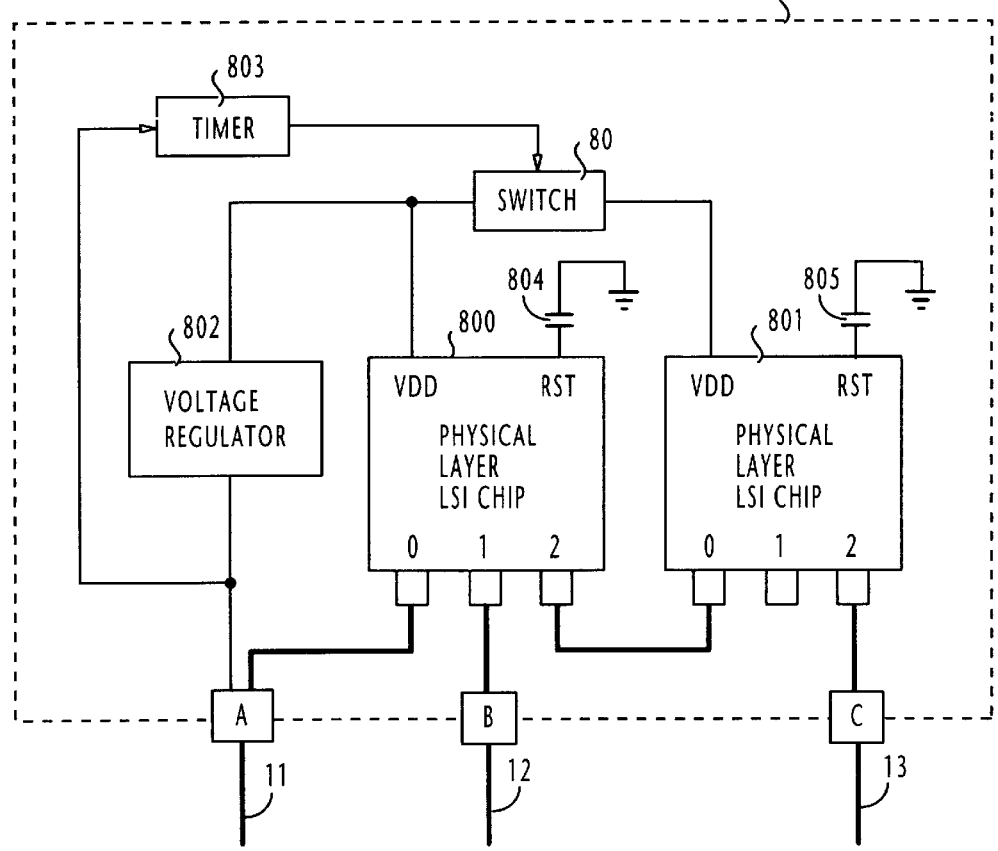
FIG. 8 is a block diagram of a further modification of the connection controller of the serial bus network of FIG. 1.

In FIG. 8, a modified connection controller 10B includes a switch 806 that is connected between the output of voltage regulator 802 and the power input terminal of PHY chip 801. A capacitor 805 of equal value to the capacitor 804 of PHY chip 800 is connected to the reset port RST of PHY chip 801. The output of timer 803 remains low for an initial period of two-minute when it is powered up by cable voltage. PHY chip 800 is energized by the cable voltage and initializes itself for a period determined by the capacitor 804. When the timer 803 expires, it produces a high voltage Switch 806 is responsive to the high voltage output of timer 803 for applying the output of voltage regulator to PHY chip 801. PHY chip 801 is thus energized when the two-minute timeout period expires. When energized, PHY chip 801 initializes itself for an interval set by the capacitor 805. Since the capacitor 805 has the same capacitance value as capacitor 804, the PHY chip 801 starts normal operation a 100-ms internal after it is energized.

Figure 9:
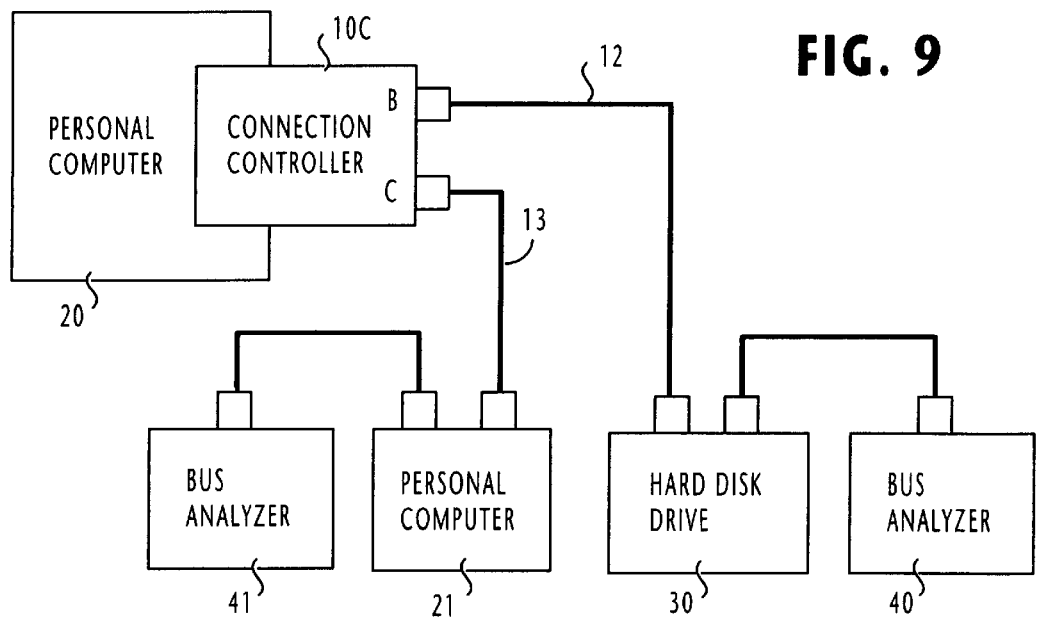
FIG. 9 is a schematic block diagram of a serial bus network according to a modified embodiment of the present invention in which the initiator computer is connected to the serial bus of a backplane environment of the network.

A modified system configuration is shown in FIG. 9 in which the connection controller designated 10C is implemented in the form of a PCI card of a personal computer and inserted to a slot of the PCI (peripheral components interconnect) bus of computer 20, instead of connecting it to the port A via the 1394 serial bus. Therefore, the connection controller 10C is provided with two ports B and C to which hard disk drive 30 and computer 21 are connected, respectively.

Figure 10:
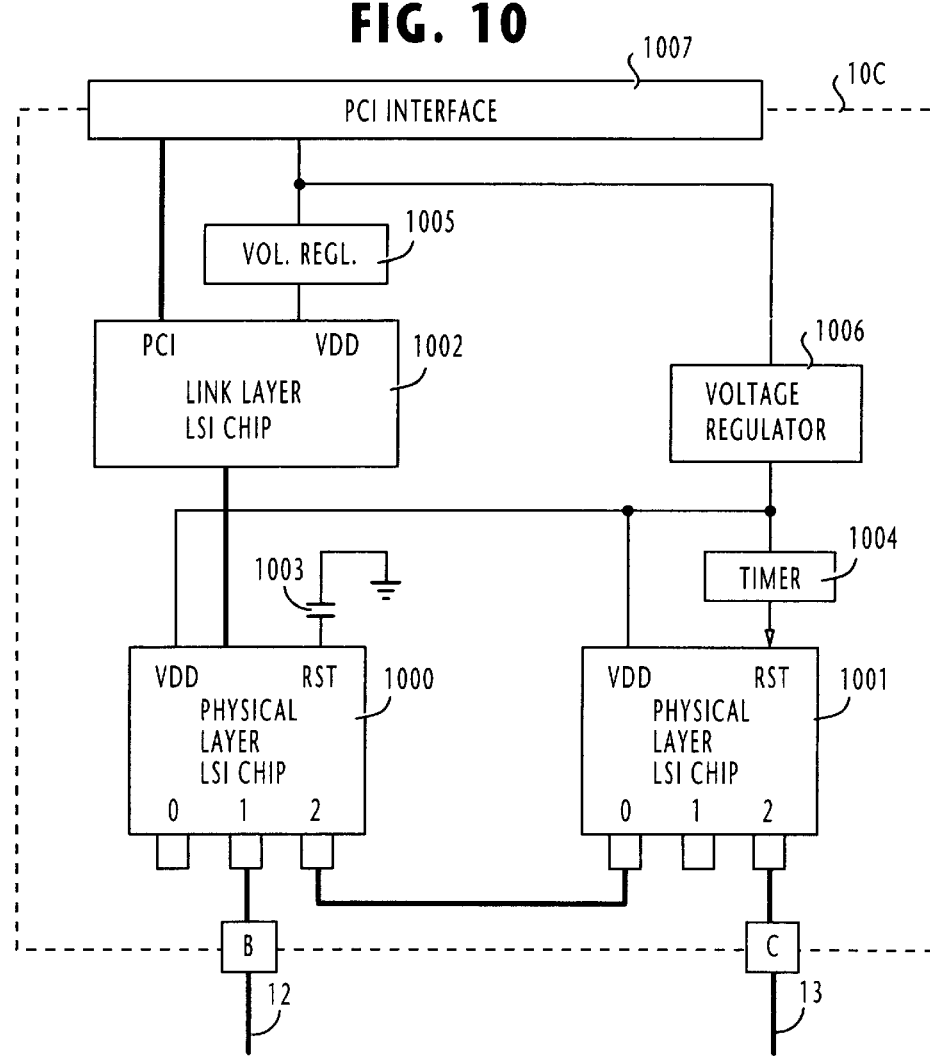
FIG. 10 is a block diagram of a connection controller of the network of FIG. 9.

As shown in detail in FIG. 10, the connection controller 10C is comprised of PHY chips 1000 and 1001, a voltage regulator 1006, a reset holding capacitor 1003 and a reset holding timer 1004. In a manner similar to FIG. 3, the PHY chips 1000 and 1001 are connected to the ports B and C of the controller 10C through their signaling ports #1 and #2, respectively, and the signaling port #2 of chip 1000 is connected to the signaling port #0 of PHY chip 1001. Voltage regulator 1006 supplies a regulated constant voltage to the PHY chips 1000, 1001 and the timer 1004. Timer 1004 is connected to the reset terminal of the PHY chip 1001 and the capacitor 1003 is connected to the reset terminal of PHY chip 1000. Reset holding timer 1004 sets the PHY chip 1001 in an initialized state for a two-minute interval immediately after the chip 1001 is energized by voltage regulator 1006, whereas the capacitor 1003 sets the PHY chip 1000 in a 100 microseconds.

Connection controller 10C is connected to the computer 20 via a PCI interface 1007 which includes a PCI/IEEE-1394 adapter, not shown, that allows communications to be established between nodes of the computer 20 (such as CPU and I/O attached to a serial bus of the IEEE-1394 backplane environment) and nodes on the serial buses 12 and 13 of the IEEE-1394 cable environment. PHY chip 1000 of the connection controller 10C is connected to the PCI interface 1007 via a link layer LSI chip 1002 using PHY/link interfaces, not shown. Link layer LSI chip 1002 is powered by a voltage regulator 1005 which is in turn connected to the power output port of the PCI interface 1007. Voltage regulator 1006 is also connected to the same power output of the PCI interface 1007.

With this configuration, the computer 20 is identified by a physical ID assigned to the PHY chip 100 during a self-ID process and devices identified by the physical IDs assigned to the PHY chip 101 are recognized as having no configuration ROM.

Figure 11A:
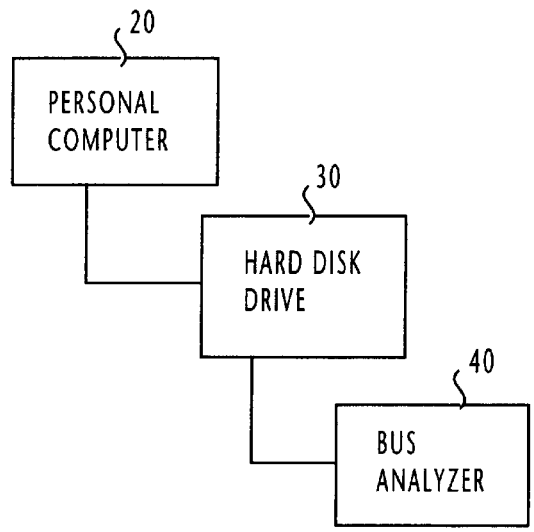
Figure 11B:
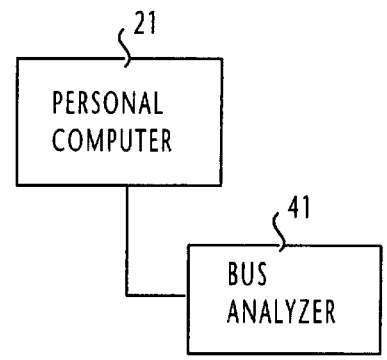
Figure 12:
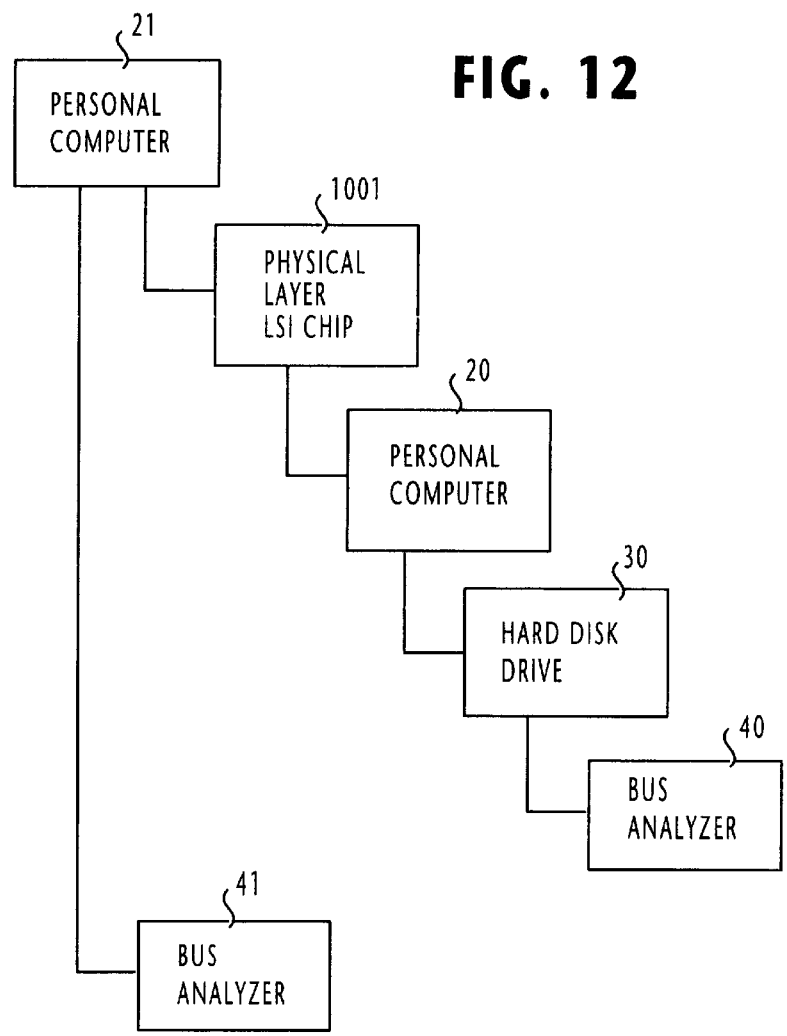

FIGS. 11A and 11B show network configurations observed by the bus analyzers 40 and 41 of FIG. 9 one minute after the computer 20 is powered on. Since the PHY chip 1001 of FIG. 10 remains in a reset state during the initial two-minute interval, it does not appear in the network configuration displayed by analyzer 41 as shown in FIG. 11B, whereas the PHY chip 1000 is already in a normal operation, it appears with the hard disk drive 30 as shown in FIG. 11A. The network configuration of FIG. 9 that occurs five minutes after the computer 20 is powered on is in a state as shown in FIG. 12.

Figure 13:
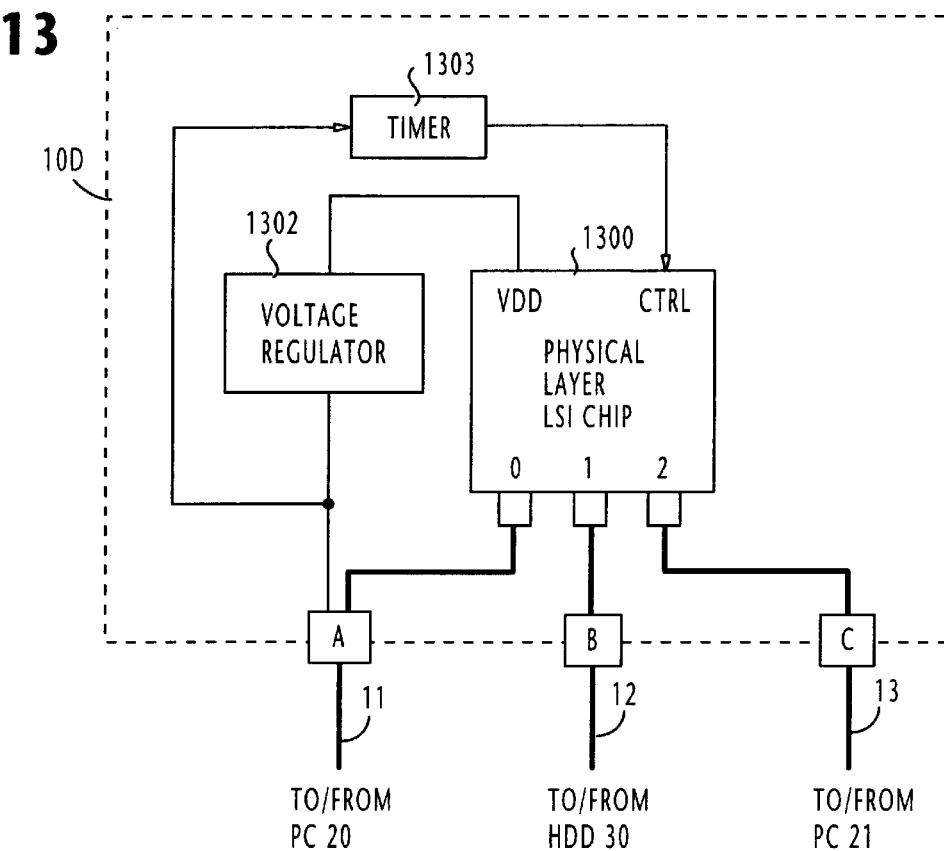
FIG. 13 is a block diagram of a single-chip modification of the connection controller of FIG. 3.

FIG. 13 is a block diagram of a connection controller 10D similar to the cable environment of the network of FIG. 1. Connection controller 10D includes a single PHY chip 1300, instead of the two PHY chips 300 and 301 of FIG. 3. PHY chip 1300 has a control port (CTRL) in addition to the signaling ports #0, #1 and #2, which are connected to the cable ports A, B and C, respectively. PHY chip 1300, powered by the constant voltage of voltage regulator 1302, is designed such that when the control port CTRL is at low level, the signaling port #2 is disabled. As long as the signaling port #2 is disabled, the PHY chip 1300 cannot initiate communication with the computer 21. Timer 1303, energized by cable power, holds the control port CTRL at low level until its timeout period, typically two minutes immediately after the computer 20 is powered on. Within this timeout period, the computer 20 will succeed in a login process and becomes an initiator node of the target node, i.e., the hard disk drive 30. Upon expiration of the timeout period, the timer 1303 drives the control port CTRL to high level, whereupon the signaling port #2 is enabled, allowing the PHY chip 1300 to establish communication with the computer 21.

Figure 14:
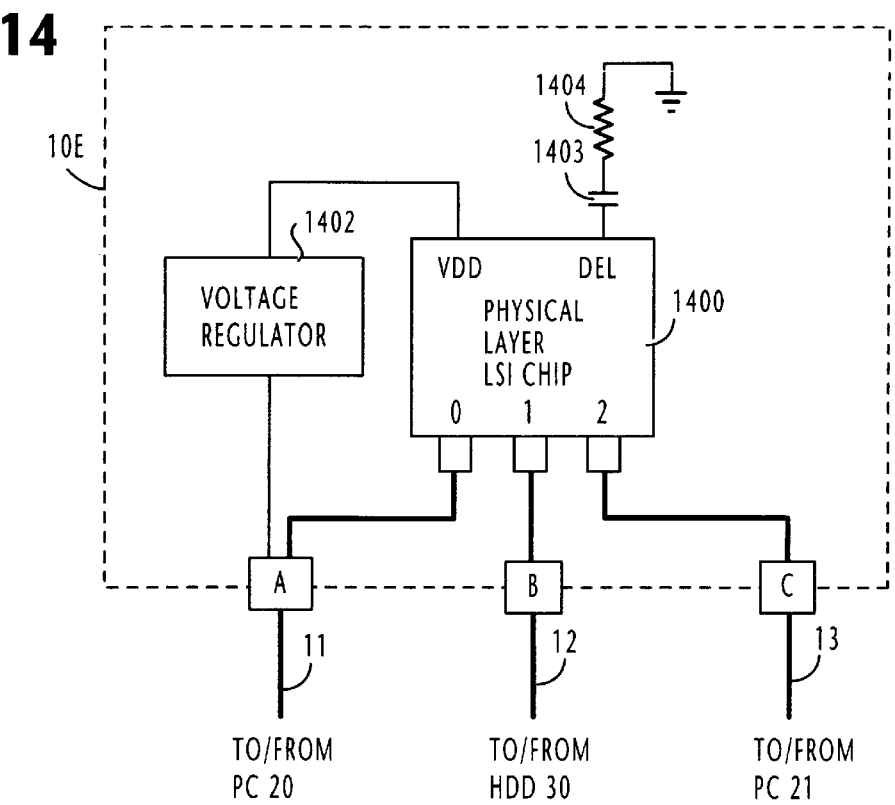
FIG. 14 is a block diagram of a further single-chip modification of the connection controller of FIG. 3.

Alternatively, the timer 1303 may be incorporated in a PHY chip 1400 of a connection controller 10E as shown in FIG. 14. The PHY chip 1400, energized by voltage regulator 1402, has a delay time port DEL which is grounded through a series of a capacitor 1403 and a resistor 1404. Physical layer chip 1400 includes a processor that adjusts the timeout period of the built-in timer according to the time constant value of the capacitor 1403 and the resistor 1404 attached to the delay time port DEL and disables the signaling port #2 from the time the built-in timer is energized to the time it expires. As long as the signaling port #2 is disabled, communication does not proceed between the PHY chip 1400 and the computer 21.

Figure 15:
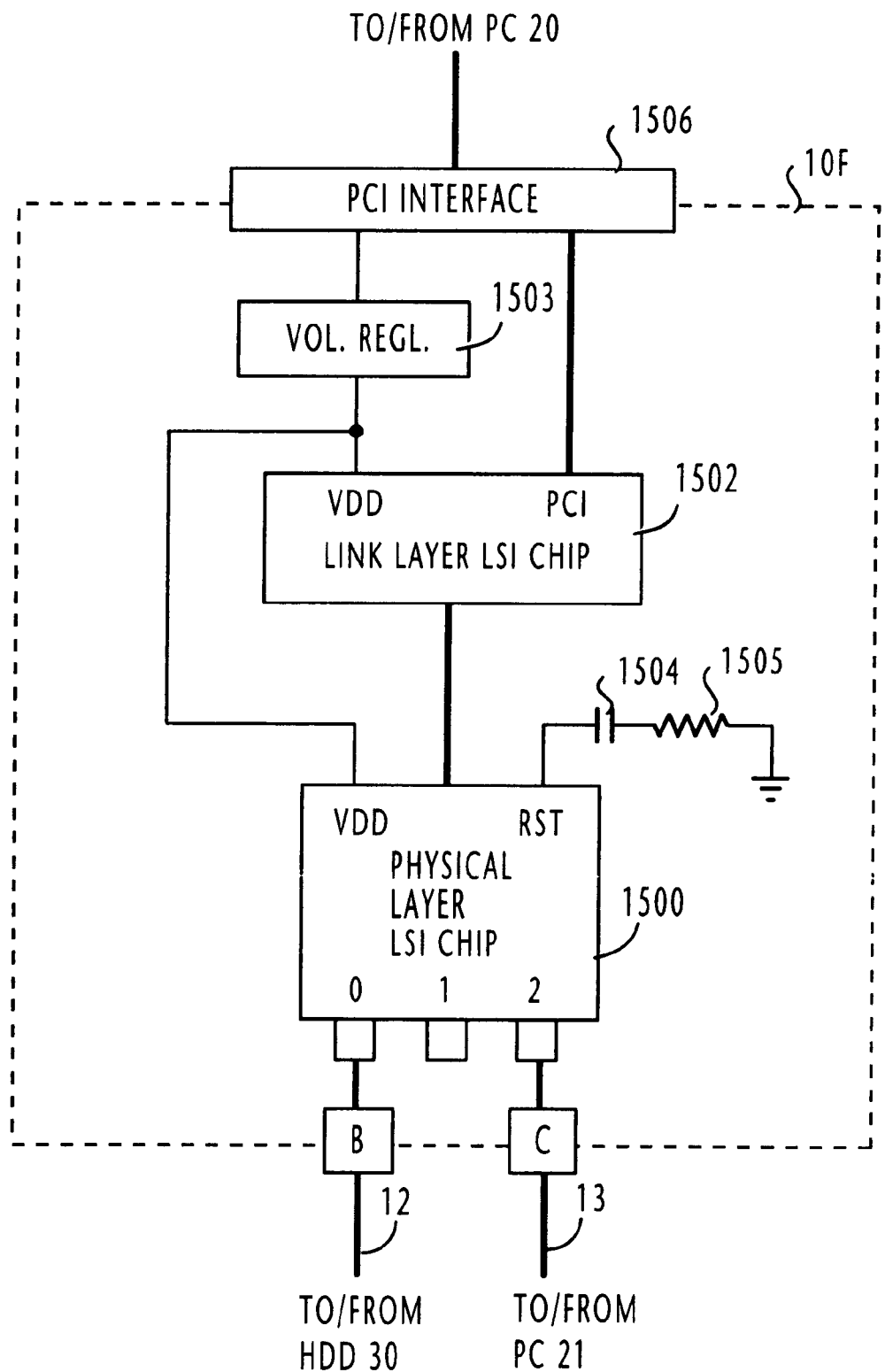
FIG. 15 is a block diagram of a single-chip modification of the connection controller of FIG. 10.

The single chip configurations of FIGS. 13 and 14 may be implemented as a connection controller 10F with the computer 20 being connected to the serial bus of the backplane environment, as shown in FIG. 15. Similar to FIG. 10, the computer 20 is coupled through a PCI interface 1506 to a link layer LSI chip 1503 which is connected to PHY chip 1500. PHY chip 1500 has signaling ports #0 and #2 connected to cable ports B and C, respectively. Both LSI chips 1500 and 1503 are powered by a constant voltage produced by voltage regulator 1502 from voltage supplied from the computer 20 via the PCI interface 1506. As one example, the PHY chip 1500 has a port DEL grounded through a series circuit of capacitor 1504 and resistor 1505.

Figure 16:
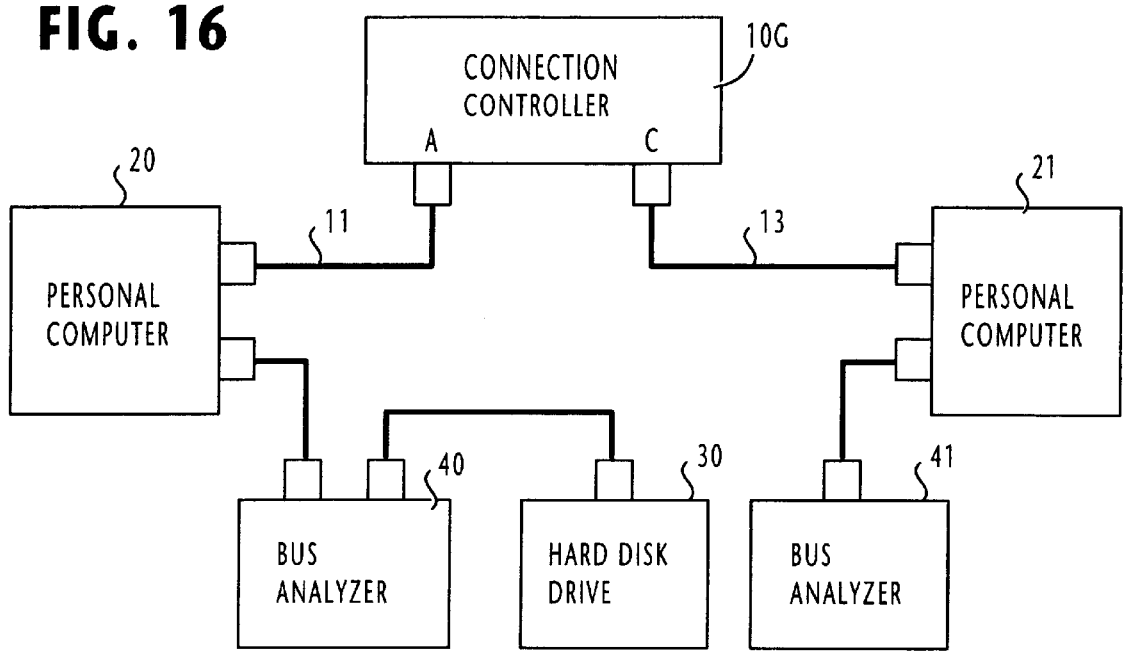
FIG. 16 is a schematic block diagram of a further modification of the serial bus network of the present invention in which a target device is connected to one cable port of an initiator computer which is connected through another cable port to a connection controller.

The serial bus network of the present invention may be further modified by using a connection controller 10G, as shown in FIG. 16. In this modification, the hard disk drive 30 is connected to the initiator computer 20 via the bus analyzer 40. During normal operation of the serial bus network, the bus analyzer 40 functions as a logically transparent link between the hard disk drive 30 and the computer 20. Connection controller 10G has two cable ports A and C with the port A being connected to the computer 20 and the port C to the computer 21 which is not an initiator of the hard disk drive 30.

Figure 17:
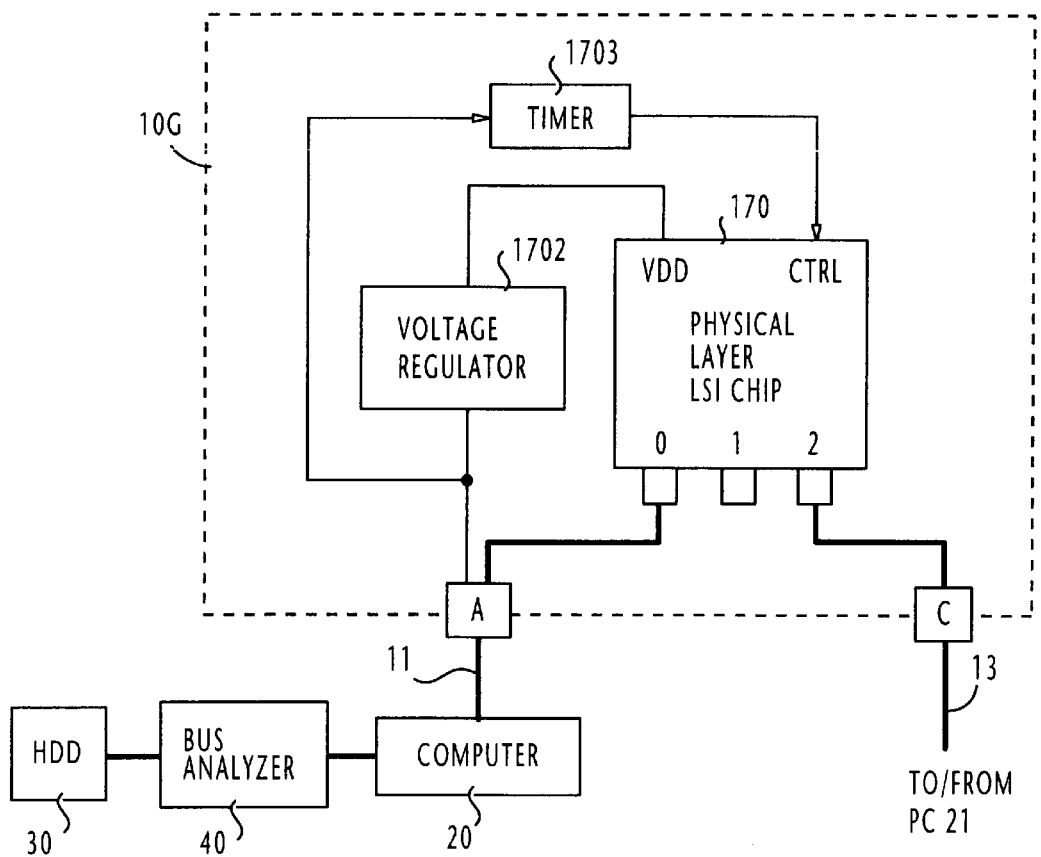
FIG. 17 is a block diagram of the connection controller of the serial bus network of FIG. 16.

As described above, the connection controller 10G may be implemented with a PHY chip operating in one of the delayed reset timing modes using a timer or capacitors or in the delayed power timing mode using a timer and a switch. As one example, the connection controller 10G is implemented with a PHY chip 1700 operating in a timer-delayed reset timing mode as illustrated in FIG. 17. PHY chip 1700, energized by voltage regulator 1702, includes signaling ports #0 and #2 respectively connected to the cable ports A and C, and a reset port RST that is connected to the output of timer 1703 powered by cable power from the computer 20 via cable port A.

With this arrangement, the timer 1703 drives the RST port of the PHY chip 1700 to a low level so that the chip 1700 is held in a reset (initialized) state for a period of 90 seconds, for example, immediately after the voltage regulator 1702 starts energizing the PHY chip 1700. During this reset period, a connection can be reliably established between the initiator computer 20 and the targeted hard disk drive 30, while the computer 21 is rendered invisible from the hard disk drive 30. When the timeout period expires, the timer 1703 drives the RST port to a high level so that the PHY chip 1700 starts normal operation.

While the foregoing description is concerned with hardware implementations of the connection controller, the following is a description of software implementations of the present invention.

Figure 18:
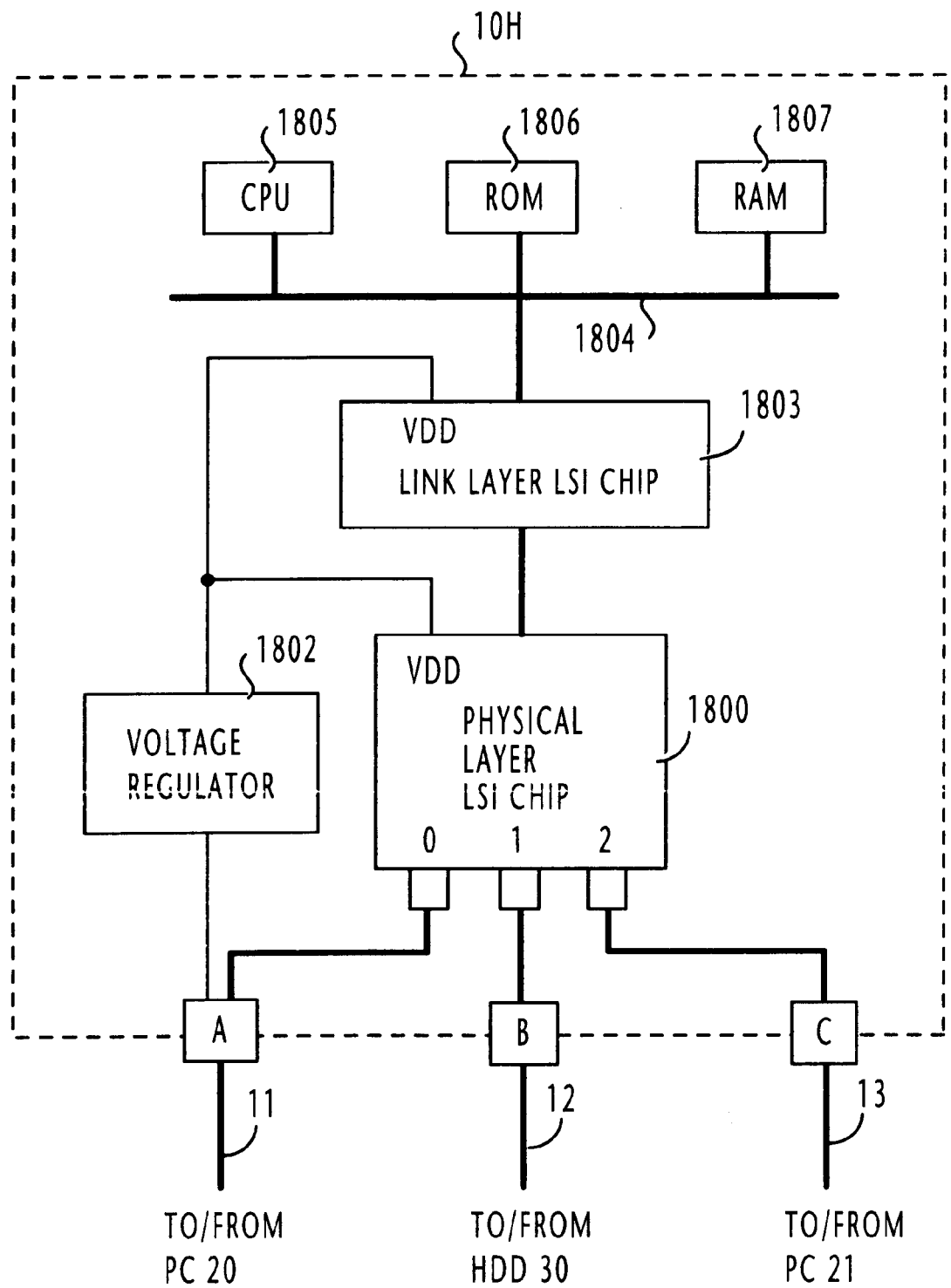
FIG. 18 is a block diagram of a further modification of the connection controller which can be used in the serial bus network of FIG. 1.

FIG. 18 shows a connection controller 10H in which the cable ports A, B and C are respectively connected to the initiator computer 20, the target hard disk drive 30 of the initiator, and the computer 21 in a configuration identical to that shown in FIG. 1. Connection controller 10H is comprised of a PHY chip 1800 having signaling ports #0, #1 and #2 connected respectively to the cable ports A, B and C. PHY LSI chip 1800 is connected to a link layer LSI chip 1803 that is connected to a bus 1804. Voltage regulator 1802 energizes both LSI chips. Link layer LSI chip 1803 includes a register, not shown, which stores information as to the configuration of devices (nodes) attached to the cable ports A, B and C. Connected to the bus 1804 are a CPU 1805, a ROM 1806 and a RAM 1807. ROM 1806 holds a programmed routine that is performed by the CPU 1805 using the RAM 1807 as a work area. The programmed routine is shown in the flowchart of FIG. 19.

Figure 19:
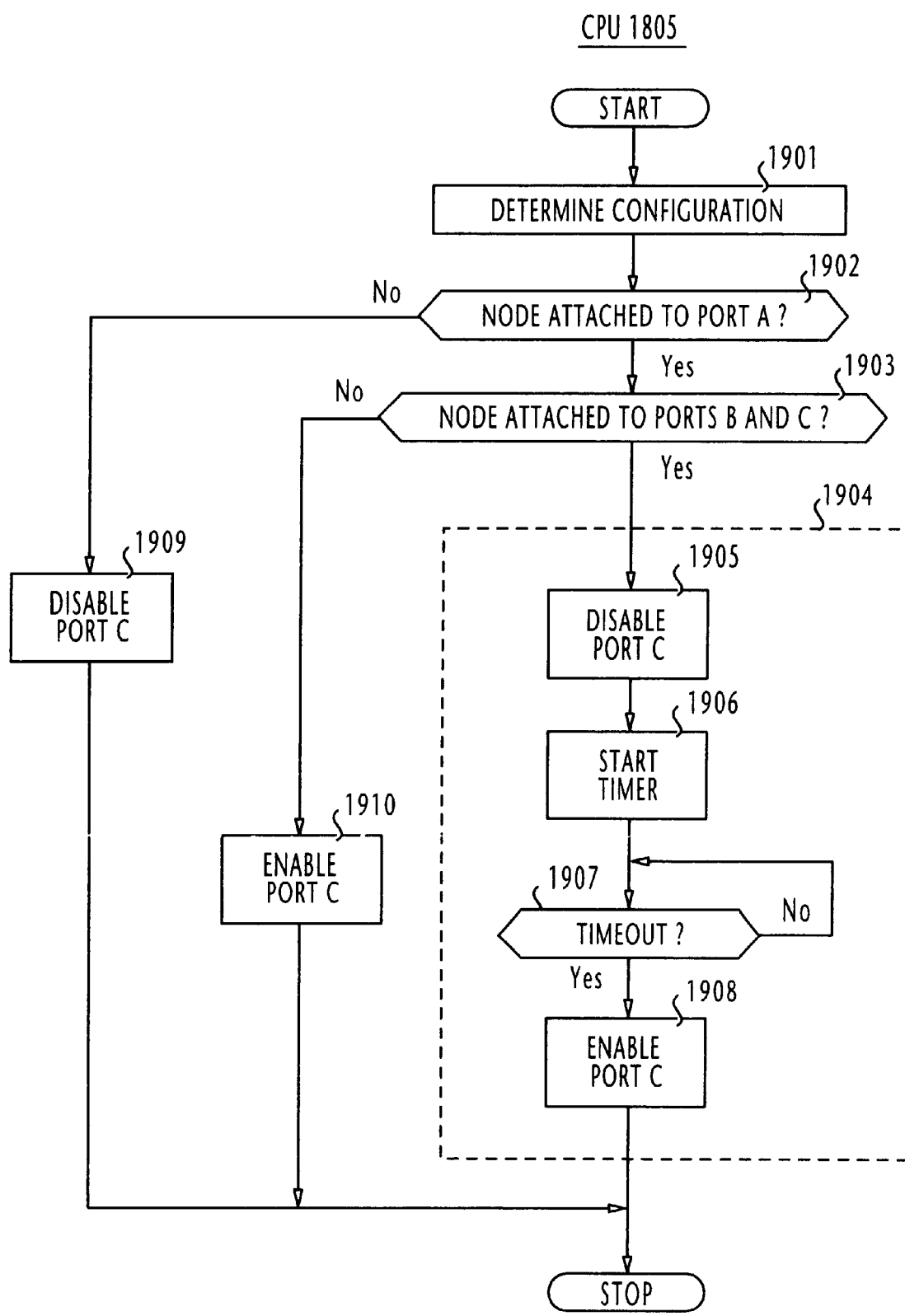
FIG. 19 is a flowchart of the operation of the CPU of the connection controller of FIG. 18.

In FIG. 19, the operation of the CPU 1805 starts with step 1901 in which the CPU 1805 reads information from the register of the link layer chip 1803 and determines the configuration of the network. If it is determined that a device is attached to the cable port A (step 1902), flow proceeds to step 1909 to disable the cable port C and terminates the routine. If an affirmative indication is given at step 1902, the CPU proceeds to step 1903 and checks to see if a device is attached to the cable ports B and C. If there is no device attached to the cable ports B and C, flow proceeds from step 1903 to step 1910 to enable the port C and terminates the routine. Thus, a device can instantly initiate a login process when it is newly connected to the port C after a login process has been completed between the computer 20 and the hard disk drive 30. If it is determined that a device is attached to one of the cable ports B and C, flow proceeds from step 1903 to subroutine 1904 in which the CPU disables the port C (step 1905) and starts a timing operation (step 1906). At the end of a predetermined timeout period, the timing operation ceases (step 1907) and the CPU enables the port C (step 1908) and terminates the routine.

Figure 20:
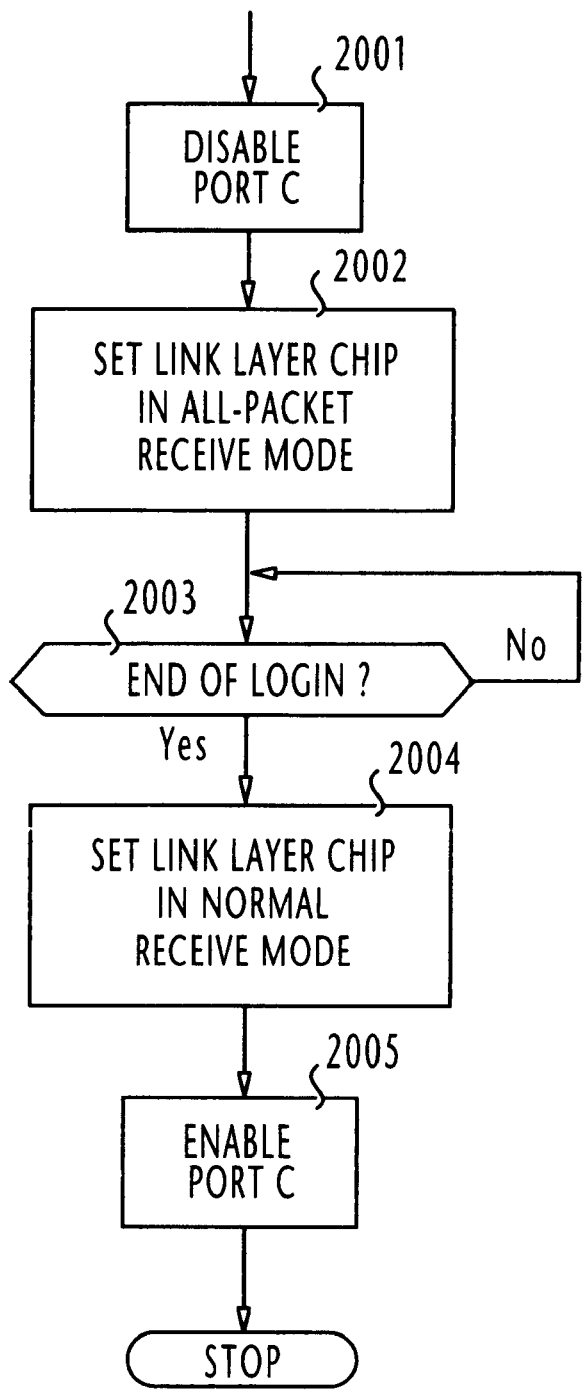
FIG. 20 is a flowchart illustrating an alternative subroutine of FIG. 19.

Subroutine 1904 can be modified as shown in FIG. 20, in which the port C is set in a disabled state for a period which may vary depending on the progress of a login process monitored on the network, rather than the port C being set in a disabled state for a fixed length of time. CPU 1805 disables the port C (step 2001), sets the link layer chip 1803 in an all-packet receive mode to receive all packets from the network regardless of their destination node identifiers (step 2002), and determines, at step 2003, whether a login process is completed. If so, the CPU proceeds to step 2004 to reset the link layer chip 1803 in a normal receive mode in which it receives only those packets having the node identifier of the link layer chip 181. At step 2005, the CPU 1805 sets the port C in an enabled state, and then terminates the routine.

Figure 21:
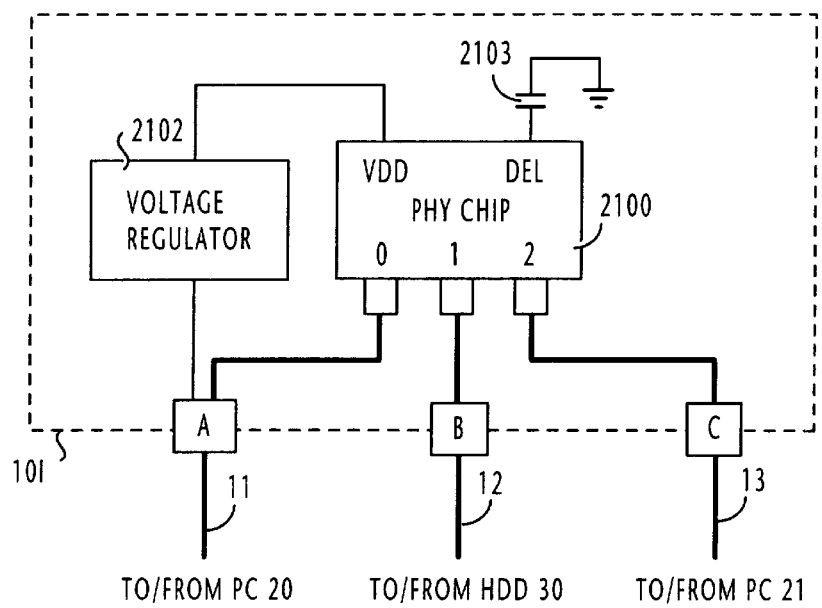
FIG. 21 is a block diagram of a connection controller to be used in the serial bus network of FIG. 1 in which the initiator computer is responsible for controlling the status of a specified cable port of the connection controller by using remote command packets.

The software-based connection control can also be implemented by installing a programmed routine on the computer 20 and attaching it to the cable port A of a connection controller 10I, as shown in FIG. 21. Connection controller 10I is implemented as a delayed reset timing mode using a capacitor 2103, for example. PHY chip 2100, energized by voltage regulator 2102 from the cable voltage from the computer 20, has a reset port RST to which the capacitor 2103 is connected.

Figure 22:
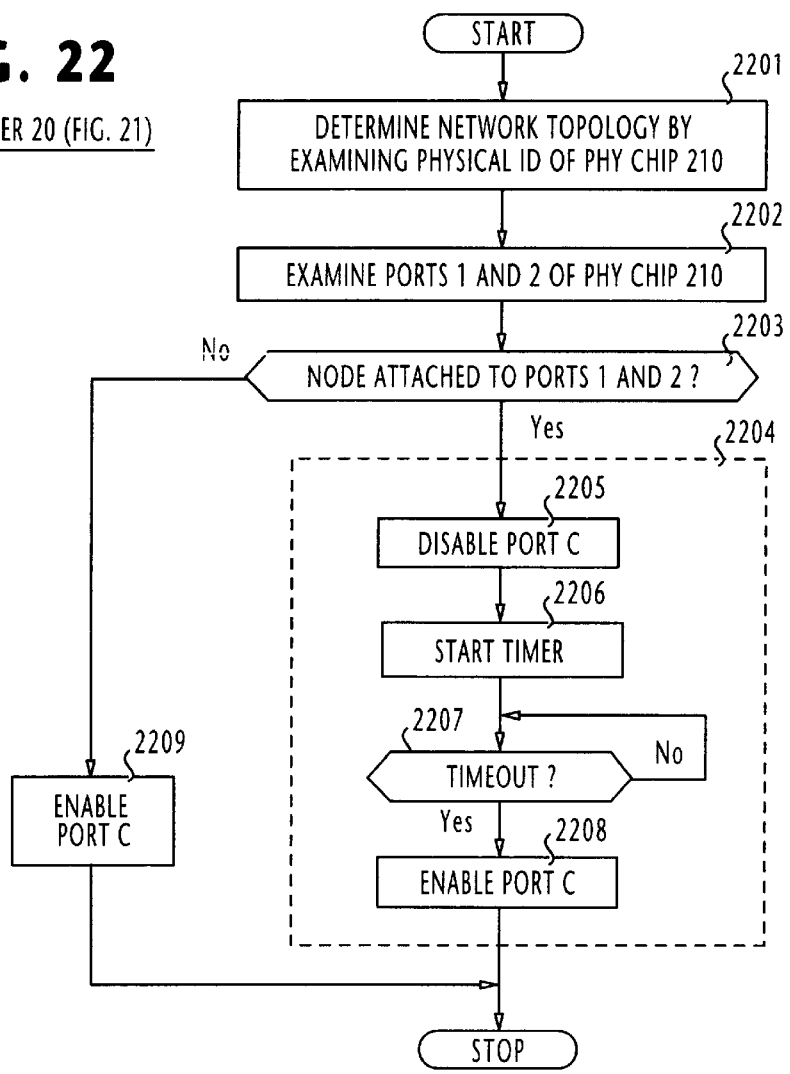
FIG. 22 is a flowchart of the operation of the initiator computer of FIG. 21.

FIG. 22 is a flowchart representation of the programmed routine installed on the computer 20 of FIG. 21. When powered on, the computer 20 examines all port status fields of the self-ID packet of the PHY chip 2100 (step 2201) and the port status of the computer 20 (i.e., port number of the port through which it is connected to the cable port A). Each port status field of the self-ID packet indicates the presence/absence of a node at a port of the cable environment and the type of a node if present. Computer 20 determines the topology of the network from the port status information of the self-ID packet and the port status information of computer 20 at the cable port A. By using the network topology the computer 20 determines whether a device is attached to the ports #1 and #2 of PHY chip 210 (step 2203). If the decision is negative at step 2203, the port C is enabled. This is achieved by formulating a remote command packet (see FIG. 23) as specified by the IEEE P1394a Draft Standard by setting the physical node identifier of PHY chip 120 in the phy_ID field 2300, the target port #2 of chip 1200 in the port number field 2301, and a decimal number "5" in the command (cmnd) field 2302 and transmitting the packet to the network (i.e., it is specified that decimal 5 is used to enable a port). If the decision is affirmative at step 2203, the computer 20 executes delayed enabling subroutine 2204 by first disabling the port C at step 2205. This is achieved by transmitting a remote command packet to the network with a decimal number "1" set in the command field (i.e., it is specified that decimal 1 is used to disable a port). A timing operation is started at step 2206. When the period of the timing operation expires (step 2207), the computer 20 enables the port C (step 2208) by sending a remote command packet to the network with a decimal 5 being set in the command field of the packet.

Figure 23:
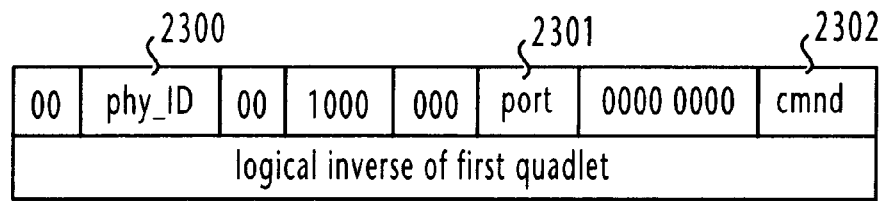
FIG. 23 shows a data structure of remote command packets.
Figure 24:
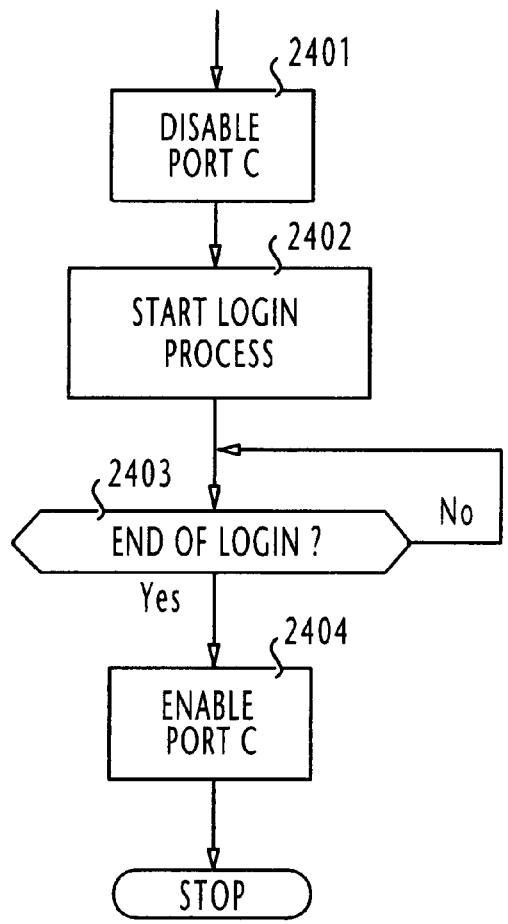
FIG. 24 is a flowchart illustrating an alternative subroutine of FIG. 23.

Alternatively, the delayed enabling subroutine 2204 of FIG. 23 may be replaced with a subroutine shown in FIG. 24. In this subroutine, the computer 20 of FIG. 21 is programmed to initially disable the port C by sending a disable remote command packet to the network (step 2401) and then starts a login process with the hard disk drive 30 (step 2402). When the login process is completed (step 2403), the computer 20 sends an enable remote command packet to the network to enable the port C (step 2404), and then terminates the routine.

What is claimed is:

1. A connection controller for a serial bus network in which a plurality of layered protocols are provided to establish communication, said layered protocols including the protocol of a physical layer, comprising:

physical layer processing circuitry for performing the protocol of said physical layer and establishing communications with first, second and third nodes of said network, said first node being specified as an initiator node and said second node is a target node of the first node, said physical layer processing circuitry being energized by power supplied from said first node; and delay means for introducing a delay time when said physical layer processing circuitry is energized, said physical layer processing circuitry establishing a logical connection between said first and second nodes during said delay time and setting said third node in a disabled state during said delay time.

2. The connection controller of claim 1, wherein said physical layer processing circuitry comprises:

a first LSI chip connected to said first and second nodes; and a second LSI chip connected to said third node, wherein said delay means comprises:

first delay means for setting the first LSI chip in a reset state for a first interval immediately after said first and second LSI chips are simultaneously energized and setting the first LSI chip in an operable state when said first interval expires; and second delay means for setting the second LSI chip in a reset state for a second interval longer than said first interval immediately after said first and second LSI chip are energized and setting the second LSI chip in an operable state when said second interval expires.

3. The connection controller of claim 1, further comprising:

first, second and third cable ports for connection to said first, second and third nodes via respective serial buses of a cable environment of said network; and wherein said delay means comprises a first capacitor having a first capacitance value and a second capacitor having a second capacitance value greater than the first capacitance value, wherein said physical layer processing circuitry comprises:

a first physical layer LSI chip having first, second and third signaling ports, said first and second signaling ports being connected respectively to said first and second cable ports, said first physical layer LSI chip initializing itself according to said first capacitance value when energized by said power from the first node; and a second physical layer LSI chip having a fourth signaling port connected to said third signaling port, and a fifth signaling port connected to said third cable port, said second physical layer LSI chip initializing itself according to said second capacitance value.

4. The connection controller of claim 3, wherein said physical layer processing circuitry comprises an LSI chip and said delay means comprises a timer for measuring elapse of time from the instant said LSI chip is energized and producing a first signal when the measured time is smaller than a predetermined value and a second signal when said measured time is greater than said predetermined value; and said LSI chip disabling said third cable port during the presence of said first signal of said timer and enabling said third cable port during the presence of said second signal.

5. The connection controller of claim 1, wherein said physical layer processing circuitry comprises:

a first LSI chip connected to said first node and said second node, said first node being an initiator node and said second node being a target node of the first node; and a second LSI chip connected to said third node, further comprising:

voltage converter means for converting a voltage supplied from said first node to an operating voltage of said first and second LSI chips, said first LSI chip being directly energized by the operating voltage of the voltage converter means; and a switch connected between said voltage converter means and said second LSI chip, said switch being set in an open state during said delay time from the instant said first LSI chip is energized and set in a closed state when said delay time expires.

6. The connection controller of claim 1, further comprising a link layer LSI chip for performing a link layer of said layered protocols, said link layer LSI chip being connected between a serial bus of backplane environment of said network and said physical layer processing circuitry, wherein said first node is connected to said physical layer processing circuitry via said backplane environment serial bus.

7. The connection controller of claim 6, further comprising a peripheral component interconnect interface for interconnecting said link layer LSI chip and said first node.

8. The connection controller of claim 1, wherein said physical layer processing circuitry comprises an LSI chip, said LSI chip including a first signaling port connected to said first node, a second signaling port connected to said second node and a third signaling port connected to said third node, said delay means controlling said LSI chip so that said third signaling port is in a disabled state for a predetermined interval immediately after said LSI chip is energized and said third signaling port is in an enabled state when said predetermined interval expires.

9. The connection controller of claim 1, further comprising:

a first cable port to which a first node is connected, said first node being connected to said second node which is a target node of the first node;

a second cable port connected to said third node;

an interface to which said first node is connected; and a link layer processing circuitry connected to said interface, said physical layer processing circuitry being connected to said interface via said link layer processing circuitry, and further connected to first and second cable ports and energized by power supplied from said first node via said interface, said first node holding said physical layer processing circuitry in a reset state during said delay time immediately after the processing circuitry is energized and establishing a logical connection between the first and second nodes during said delay time.

10. The connection controller of claim 9, wherein said interface comprises a peripheral component interconnect interface card.

11. The connection controller of claim 1, further comprising:
   a first cable port to which said first node is connected, said first node being further connected to said second node;
   a second cable port connected to said third node; and
   said physical layer processing circuitry being connected to said first and second cable ports and energized by power supplied from said first node via said first cable port,
   said first node holding said physical layer processing circuitry in a disabled state during said delay time immediately after the processing circuitry is energized and establishing a logical connection between the first and second nodes during said delay time.

12. A connection controller for a serial bus network in which a plurality of layered protocols are provided to establish communication, said layered protocols including the protocols of a physical layer and a link layer, comprising:
   first, second and third cable ports, said first cable port being connected to a first node;
   physical layer processing circuitry for performing the protocol of said physical layer, the physical layer processing circuitry being connected to said first, second and third cable ports and energized by power supplied from said first node through said first cable port;
   link layer processing circuitry for performing the protocol of said link layer and being energized by power supplied from said first node through said first cable port; and
   control circuitry connected to said physical layer processing circuitry via said link layer processing circuitry,
   said control circuitry determining whether second and third nodes are respectively present at said second and third cable ports, setting said third cable port in a disabled state immediately after said physical layer processing circuitry is energized while establishing a logical connection between the first and second nodes if said second and third nodes are determined to be present at said second and third cable ports, and setting the third cable port in an enabled state after said logical connection is established.

13. The connection controller of claim 12, wherein said control circuitry is configured to set the third cable port in said enabled state if said second and third nodes are determined to be absent at said second and third cable ports.

14. The connection controller of claim 12 or 13, wherein said control circuitry is configured to:
   set the third cable port in said disabled state for a predetermined interval, and
   set the third cable port in said enabled state when said predetermined interval expires.

15. The connection controller of claim 12 or 13, wherein said control circuitry is configured to:
   set the link layer processing circuitry in an all-packet receive mode for receiving packets regardless of their destinations,
   set the link layer processing circuitry in a normal receive mode for receiving packets only destined for the link layer processing circuitry, and
   set the third cable port in said enabled state when said logical connection is established between said first and second nodes.

16. A serial bus network in which a plurality of layered protocols are provided to establish communication, said layered protocols including the protocol of a physical layer, comprising:
   first, second and third nodes;
   first, second and third cable ports, said first cable port being connected to said first node;
   physical layer processing circuitry for performing the protocol of said physical layer, the physical layer processing circuitry being connected to said first, second and third cable ports and being energized by power supplied from said first node through said first cable port;
   said first node determining a network topology of nodes connected to said second and third cable ports, determining from the network topology whether said second and third nodes are present at said second and third cable ports, respectively, disabling said third cable port immediately after the physical layer processing circuitry is energized while establishing a logical connection with the second node, and enabling said third cable port after said logical connection is established.

17. The serial bus network of claim 16, wherein said first node is configured to set the third cable port in said enabled state if said second and third nodes are determined to be absent at said second and third cable ports.

18. The serial bus network of claim 16 or 17, wherein said first node is configured to:
   set the third cable port in said disabled state for a predetermined interval, and
   set the third cable port in said enabled state when said predetermined interval expires.

19. The serial bus network of claim 16 or 17, wherein said first node is configured to:
   set the third cable port in said disabled state,
   start a login process with said second node, and
   set the third cable port in said enabled state if said login process is successfully completed.

20. The serial bus network of claim 19, wherein said first node is configured to perform said login process according to Serial Bus Protocol 2 standard.

21. The serial bus network of claim 16, wherein said first node is configured to transmit a remote command packet to said network for setting the third cable port in either of said disabled and enabled states according to IEEE-1394 serial bus standard.

22. A processing circuit for a physical layer of layered protocols of a serial bus network, comprising:
   a plurality of signaling ports;
   a port status control terminal; and
   an LSI chip connected to said signaling ports and said port status control terminal for performing the protocol of a physical layer, the LSI chip being responsive to a control signal received through said port status control terminal for holding a predetermined one of said signaling ports in a disabled state and holding the predetermined signaling port in an enabled state when said control signal changes state.

23. A physical layer LSI chip for a physical layer of layered protocols of a serial bus network, comprising:
   a plurality of signaling ports;
   timer means for measuring elapse of time from the instant said physical layer LSI chip is energized and producing a first signal when the measured time is smaller than a predetermined value and a second signal when said measured time is greater than said predetermined value; and
   port status control means for disabling a predetermined one of said signaling ports during the presence of said first signal of said timer means and enabling said predetermined signaling port during the presence of said second signal.

24. A method of controlling a serial bus network in which a plurality of layered protocols are defined to establish communication, said layered protocols including the protocol of a physical layer, wherein said network includes first, second and third nodes and physical layer processing circuitry associated with said first, second and third nodes for performing the protocol of said physical layer, wherein said first node is specified as an initiator node and said second node is a target node of the first node, the method comprising the steps of:

energizing said physical layer processing circuitry with power from said first node when said first node is powered on; and responsive to said physical layer processing circuit being energized, allowing said physical layer processing circuitry to establish a logical connection between said first and second nodes and preventing said physical layer processing circuitry from establishing a logical connection between said second and third nodes.

* * * * *